(12) United States Patent
Chang et al.

(10) Patent No.: US 7,731,089 B2
(45) Date of Patent: Jun. 8, 2010

(54) INTERACTIVE PHYSICAL MAIL CONTENT MANAGEMENT

(75) Inventors: David Yu Chang, Austin, TX (US); John Yow-Chun Chang, Austin, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 11/463,089

(22) Filed: Aug. 8, 2006

(65) Prior Publication Data

US 2008/0040242 A1    Feb. 14, 2008

(51) Int. Cl.
| | |
|---|---|
| *G06F 19/00* | (2006.01) |
| *G06Q 30/00* | (2006.01) |
| *G06Q 90/00* | (2006.01) |
| *G06F 17/00* | (2006.01) |
| *G07B 17/02* | (2006.01) |
| *G08B 13/08* | (2006.01) |
| *G08B 13/14* | (2006.01) |
| *G08B 13/12* | (2006.01) |

(52) U.S. Cl. ............... 235/385; 235/383; 235/487; 705/401; 340/545.6; 340/569; 340/572.1

(58) Field of Classification Search ............... 235/385, 235/383, 487, 492, 493; 705/401, 405, 406; 340/545.6, 569, 572.1
See application file for complete search history.

(56) References Cited

U.S. PATENT DOCUMENTS

| | | | | |
|---|---|---|---|---|
| 5,023,595 | A * | 6/1991 | Bennett ............... | 340/569 |
| 5,036,310 | A | 7/1991 | Russell | |
| 5,247,282 | A * | 9/1993 | Marshall ............... | 340/569 |
| 5,377,906 | A * | 1/1995 | Mason ............... | 232/34 |
| 5,497,140 | A * | 3/1996 | Tuttle ............... | 340/10.1 |
| 6,081,827 | A * | 6/2000 | Reber et al. ............... | 709/200 |
| 6,114,959 | A * | 9/2000 | Bennett ............... | 340/569 |
| 6,275,154 | B1 * | 8/2001 | Bennett et al. ............... | 340/569 |
| 6,463,354 | B1 * | 10/2002 | Pintsov ............... | 700/227 |
| 6,483,433 | B2 | 11/2002 | Moskowitz et al. | |
| 6,532,452 | B1 * | 3/2003 | Pintsov et al. ............... | 705/401 |
| 6,665,489 | B2 * | 12/2003 | Collart ............... | 386/94 |
| 6,732,152 | B2 * | 5/2004 | Lockhart et al. ............... | 709/206 |
| 6,867,044 | B2 * | 3/2005 | Cordery et al. ............... | 436/1 |

(Continued)

FOREIGN PATENT DOCUMENTS

JP    2004200854    7/2004

OTHER PUBLICATIONS

U.S. Appl. No. 11/463,102, filed Aug. 8, 2006, Chang et al.

(Continued)

*Primary Examiner*—Daniel Walsh
(74) *Attorney, Agent, or Firm*—Yee & Associates, P.C.; David A. Mims, Jr.

(57) ABSTRACT

A computer implemented method, apparatus, and computer usable program code for interactive mail management of physical mail. Physical mail is received in a mailbox. An identifier is read in response to receiving the physical mail in the mailbox. The physical mail contains the identifier. Information contained in the identifier is sent to the mail recipient. The mail recipient is able to identify instructions for communicating with a sender associated with the physical mail based on the information from the identifier.

16 Claims, 4 Drawing Sheets

U.S. PATENT DOCUMENTS

| | | | |
|---|---|---|---|
| 6,879,255 B1* | 4/2005 | Jezierski | 340/540 |
| 6,892,939 B2* | 5/2005 | Silver et al. | 235/375 |
| 6,920,438 B2* | 7/2005 | Pintsov et al. | 705/401 |
| 6,957,767 B2* | 10/2005 | Aupperle et al. | 232/45 |
| 6,959,292 B1 | 10/2005 | Pintsov | |
| 6,978,929 B2* | 12/2005 | Buie et al. | 235/382 |
| 6,995,671 B2* | 2/2006 | Dutta et al. | 340/569 |
| 7,225,971 B1* | 6/2007 | Cherry | 232/34 |
| 7,249,705 B2 | 7/2007 | Dudley | |
| 7,428,576 B2 | 9/2008 | Shuster | |
| 7,525,429 B2 | 4/2009 | Carrigan | |
| 7,528,722 B2 | 5/2009 | Nelson | |
| 2001/0029495 A1* | 10/2001 | Yagihashi et al. | 705/67 |
| 2001/0042055 A1* | 11/2001 | Didriksen et al. | 705/407 |
| 2002/0032613 A1* | 3/2002 | Buettgenbach et al. | 705/26 |
| 2002/0046194 A1* | 4/2002 | Gelfer | 705/401 |
| 2002/0103697 A1* | 8/2002 | Lockhart et al. | 705/14 |
| 2002/0165729 A1* | 11/2002 | Kuebert et al. | 705/1 |
| 2003/0046103 A1* | 3/2003 | Amato et al. | 705/1 |
| 2003/0115161 A1 | 6/2003 | Cordery et al. | |
| 2003/0132296 A1* | 7/2003 | Silver et al. | 235/385 |
| 2003/0155414 A1* | 8/2003 | Silver et al. | 235/375 |
| 2003/0206643 A1* | 11/2003 | Sansone | 382/101 |
| 2003/0231112 A1* | 12/2003 | Raju | 340/569 |
| 2004/0049471 A1* | 3/2004 | Pintsov | 705/406 |
| 2004/0094615 A1* | 5/2004 | Sansone et al. | 235/375 |
| 2004/0134982 A1* | 7/2004 | Jouvin et al. | 235/384 |
| 2004/0188522 A1* | 9/2004 | Ashaari | 235/385 |
| 2005/0006452 A1* | 1/2005 | Aupperle et al. | 232/45 |
| 2005/0116047 A1* | 6/2005 | Lu et al. | 235/487 |
| 2005/0136886 A1* | 6/2005 | Aarnio et al. | 455/404.2 |
| 2005/0218220 A1* | 10/2005 | Silver et al. | 235/384 |
| 2005/0247771 A1 | 11/2005 | Engel | |
| 2005/0284941 A1* | 12/2005 | Lubow | 235/462.01 |
| 2006/0047610 A1* | 3/2006 | Parkos et al. | 705/410 |
| 2006/0083359 A1* | 4/2006 | Mukunya | 379/88.13 |
| 2006/0113368 A1* | 6/2006 | Dudley | 232/31 |
| 2006/0124722 A1* | 6/2006 | Williams et al. | 235/375 |
| 2006/0168012 A1* | 7/2006 | Rose et al. | 709/206 |
| 2006/0245554 A1* | 11/2006 | Kessler et al. | 379/88.12 |
| 2006/0273167 A1* | 12/2006 | Baldassari et al. | 235/385 |
| 2007/0118488 A1* | 5/2007 | Bozzomo et al. | 705/406 |
| 2007/0174136 A1* | 7/2007 | Kwak | 705/26 |
| 2007/0190943 A1* | 8/2007 | Little | 455/41.2 |
| 2007/0250326 A1* | 10/2007 | Kadaba | 705/1 |
| 2008/0040242 A1* | 2/2008 | Chang et al. | 705/28 |
| 2008/0040243 A1* | 2/2008 | Chang et al. | 705/28 |
| 2008/0061966 A1 | 3/2008 | Nelson | |
| 2008/0104179 A1 | 5/2008 | Agrawal et al. | |
| 2008/0147423 A1* | 6/2008 | Braun et al. | 705/1 |
| 2009/0005901 A1* | 1/2009 | Stemmle et al. | 700/215 |
| 2009/0037196 A1* | 2/2009 | Chang et al. | 705/1 |
| 2009/0084836 A1* | 4/2009 | Dudley | 232/34 |

OTHER PUBLICATIONS

Kimbrough el al., "On Automated Message Processing in Electronic Commerce and Work Support Systems: Speech Act Theory and Expressive Felicity", ACM Transactions on Information Systems, vol. 15, No. 4, Oct. 1997, pp. 321-367.

Brush et al., "Notification for Shared Annotation of Digital Documents", CHI 2002, vol. 4, Issue 1, pp. 89-96.

Kosatka et al, "From Yellow Stickies to the World-Wide Web: The Evolution of Problem Tracking at the University of Houston", SIGUCCS'04, Baltimore Maryland, 2004, pp. 94-100.

* cited by examiner

| ELECTRONIC LABEL | |
|---|---|
| 402 — SENDER | PIZZA MART |
| 404 — CONTENT | COUPONS |
| 406 — DESCRIPTION | LARGE ONE TOPPING: $5.99 |
| 408 — COUPON CODE | 062109 |
| 410 — EXPIRATION | 11:59 p.m. - June 21, 2009 |
| 412 — PHONE NUMBER | (999) 899-999 TEXT: 99949 |
| 414 — EMAIL ADDRESS | orders@pizzamart.com |
| 416 — HYPERLINK | www.pizzamart.pizza |
| 418 — RECEIVED | June 9, 2009 |

FIG. 4B

| ELECTRONIC LABEL | |
|---|---|
| 420 — CUSTOMER NAME | Penelope Sherman |
| 422 — CUSTOMER ADDRESS | 42 Wallaby Way, Austin TX 99999 |
| 424 — CUSTOMER CONTACT INFORMATION | (999) 899-9999 ps@pspsp.com |
| 404 — CONTENT | COUPONS |
| 408 — COUPON CODE | 062109 |
| 410 — EXPIRATION | 11:59 p.m. - June 21, 2009 |
| 426 — AUTHORIZING PARTY | H. Simpson - Manager |
| 428 — ORDER DETAILS | 2 LARGE PEPPERONI PIZZAS FOR 5.99 EACH |

INTERACTIVE PHYSICAL MAIL CONTENT MANAGEMENT

BACKGROUND OF THE INVENTION

1. Field of the Invention

The present invention relates generally to data processing systems and more particularly, to a computer implemented method, apparatus, and computer usable program code for interactive physical mail content management.

2. Description of the Related Art

Despite the transition of many forms of communication to electronic mail, most individuals, companies, and other groups or organizations are still dependent on mail in the form of physical mail. Many people use mail for personal and business communications and transactions. In many cases, mail provides a communication service that is both necessary and important to the mail recipient. Mail is physical mail, such as postal mail, and may be delivered by the postal service or other similar contracting or delivery services.

In many cases, mail recipients receive mail in a remote mailbox. Checking the remote mailbox may require time and effort regardless of whether there is actually mail in the mailbox. For example, in many cities, an individual may have a mailbox in the nearest mail facility. The mail facility may be miles away from the location of the mail recipient. In other cases, the individual may live in a rural area with a distant mailbox.

Different pieces of mail are of different importance to the mail recipient. For example, bills may be considered of high importance to the mail recipient while so called junk mail for a sweepstakes may be of low importance. In some cases, a mail recipient may spend time and effort to check the contents of the mailbox without knowing whether any of the information of the delivered mail provides value to the recipient. In many cases, the mail recipient may feel that time is wasted checking the mailbox to retrieve low importance mail. Using current technology, a mail recipient is only able to interact with received mail by physically retrieving the mail, opening the mail, and visually determining the mail contents.

SUMMARY OF THE INVENTION

The illustrative embodiments provide a computer implemented method, apparatus, and computer usable program code for interactive mail management of physical mail. Physical mail is received in a mailbox. An identifier is read in response to receiving the physical mail in the mailbox. The physical mail contains the identifier. Information contained in the identifier is sent to the mail recipient. The mail recipient is able to identify instructions for communicating with a sender associated with the physical mail based on the information from the identifier.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
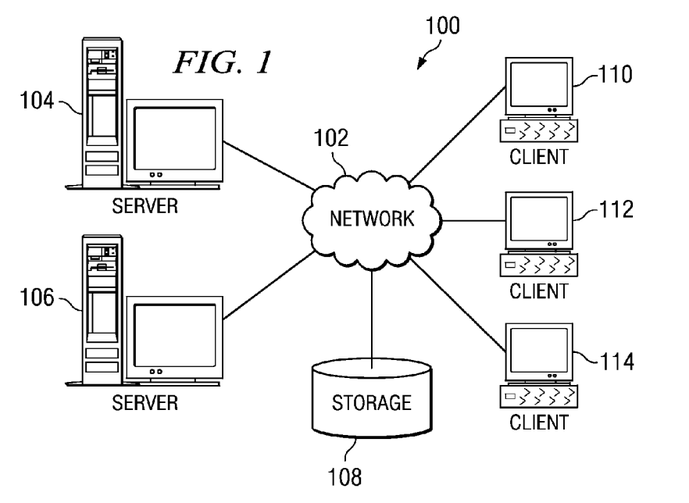
FIG. 1 is a pictorial representation of a data processing system in which the illustrative embodiments may be implemented.
Figure 2:
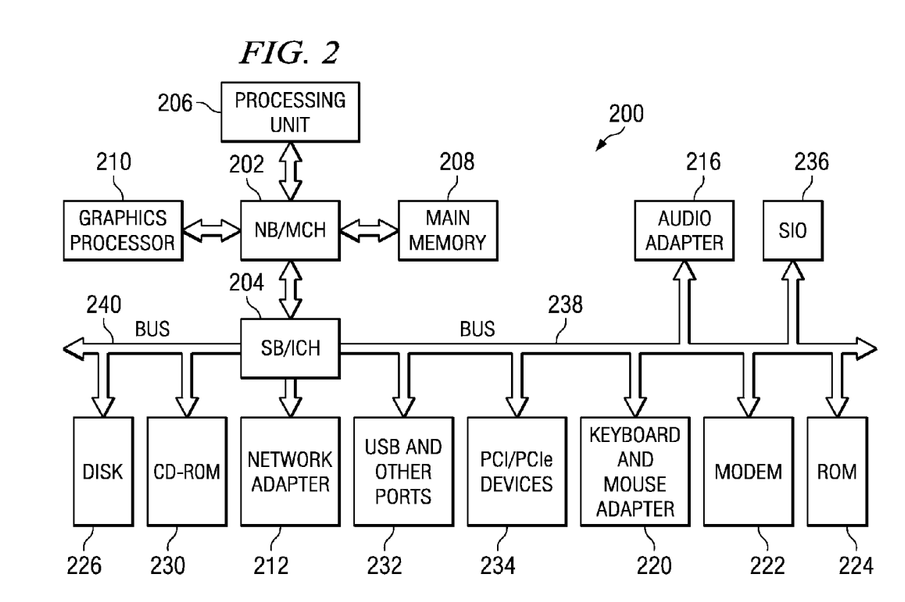
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, apparatus, and computer usable program code for physical mail content management. The mailbox extracts information from each piece of mail using a label. The label is information about the piece of mail including content and contact information. All mail received by the mailbox in physical form in the illustrative embodiments is physical mail referred to as mail and is received in a physical mailbox. The illustrative embodiments are particularly useful for managing content of a mailbox that is in a remote or different location from the mail recipient. Electronic mail is referred to separately as email. Information extracted from the label is information or data regarding the contents and importance of each piece of mail.

In one illustrative embodiment the electronic identification label is a radio frequency identification (RFID) tag. The mailbox notifies the mail recipient of the mail and information relevant to the user. The user may use the relevant information before or after retrieving the mail from the mailbox to communicate with the sender. The relevant information also includes instructions for communicating with the sender. The sender is the person sending the mail to the mail recipient. For example, the instructions may be a phone number, hyperlink, email address, text number, or instant message identifier, or other communication instructions. In one example, the relevant information may be used by a user to perform a business transaction.

Figure 3:
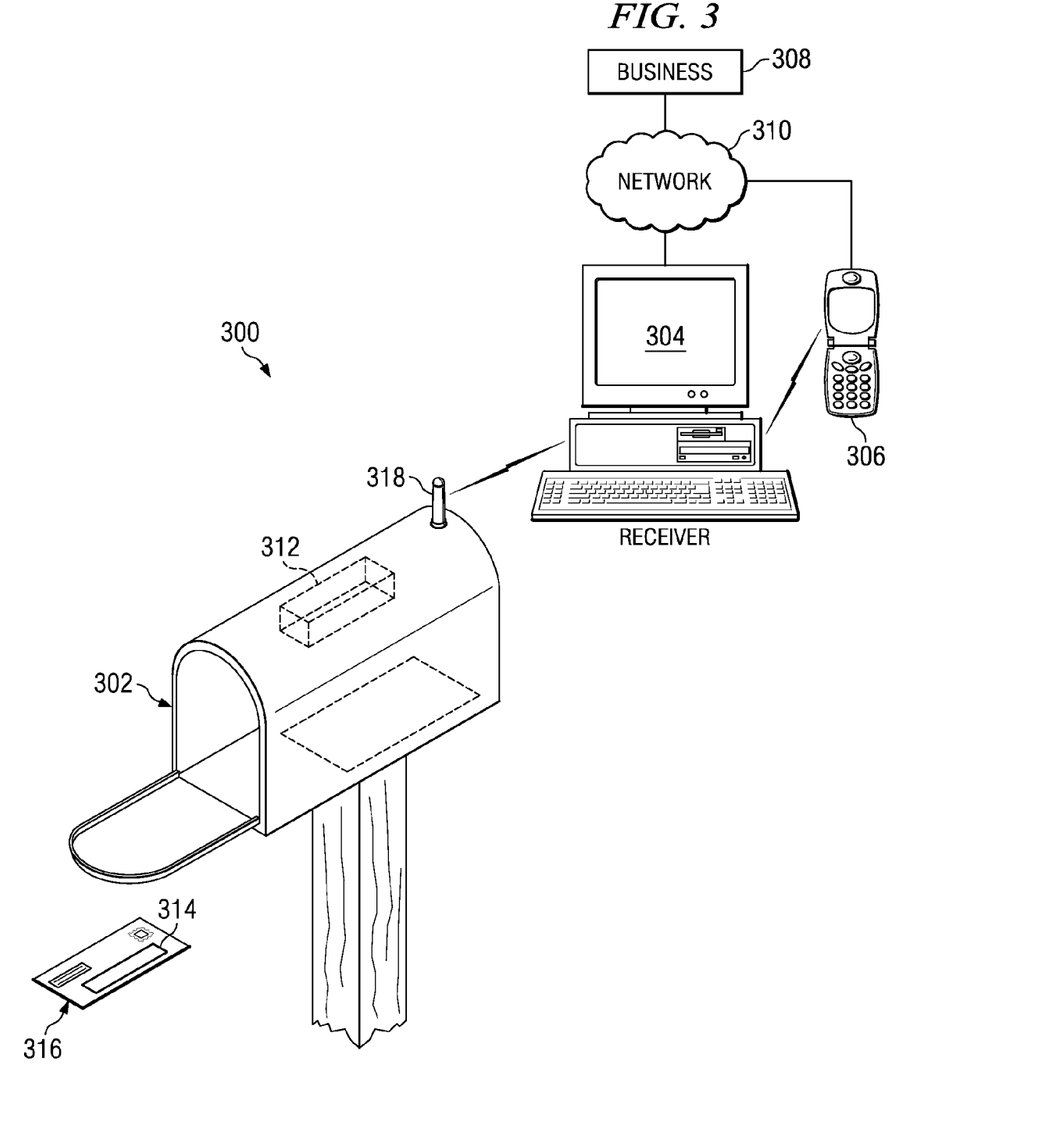
FIG. 3 is a block diagram of a remote mailbox management system in accordance with the illustrative embodiments.

With reference to FIG. 3, a block diagram of a remote mailbox management system is depicted in accordance with the illustrative embodiments. Remote mailbox management system 300 includes various communicating components, such as mailbox 302, receiver 304, cell phone 306, and business 308. The various components may communicate via network 310. Network 310 may be a network, such as network 102 of FIG. 1.

Mailbox 302 may include numerous elements, allowing the mail recipient to interact with mailbox 302. In one illustrative embodiment, mailbox 302 includes scanner 312 for scanning information from a label. Scanner 312 may use radio frequencies, optical character recognition, bar codes, or other techniques for extracting embedded information from the label. The label may be a printed label or an electronic label that specifies information about each piece of mail. Each piece of mail may be scanned individually or as a group as placed in mailbox 302.

In one illustrative embodiment, the label is an electronic identification label such as radio frequency identification (RFID) tag 314 that is part of mail 316. Mailbox 302 may receive multiple pieces of mail in assorted forms. Mail 316 may be a postcard, letter, package, or other deliverable mail content. Each piece of mail 316 may include radio frequency identification tag 314. Radio frequency identification tag 314 is an automatic device that transmits a predetermined message in response to a predefined received signal from scanner 312.

In these depicted examples, radio frequency identification tag 314 may be a passive radio frequency identification tag that receives, amplifies, and retransmits a signal on a different frequency back to scanner 312. Passive radio frequency identification tags may include a minute antenna, integrated circuit, and memory. For example, the minute electrical current induced in an antenna of radio frequency identification tag 314 by the incoming radio frequency signal provides just enough power for a CMOS integrated circuit (IC) in the tag to power up and transmit a response.

In one illustrative embodiment, mailbox 302 transmits the label information from radio frequency identification tag 314 to receiver 304 or cell phone 306 via wireless antenna 318. Receiver 304 may be a client device, such as client 110 of FIG. 1. In another illustrative embodiment, mailbox 302 is physically connected to network 310 by a phone line, Ethernet connection, or other communication medium for transmitting the label information of radio frequency identification tag 314. The label may be stored in receiver 304 or cell phone 306. The information from radio frequency identification tag 314 may be streamed in various forms to receiver 304. In one example, the information is sent via email to receiver 304. In another example, the information is updated to a mail program application executed on receiver 304.

Receiver 304 displays relevant information from radio frequency identification tag 314 to a user. As a result, the user may view relevant information before physically retrieving mail 316. The relevant information is the portion of the label information relevant to the user. Not all information contained in the label of radio frequency identification tag 314 may be relevant to the user. For example, the label may specify the person at PizzaMart that authorized the coupon. Relevant information may identify instructions for communicating with a party associated with mail 316. For example, the relevant information may identify instructions, such as, for example, an email address, phone number, or chat name, for contacting the nearest PizzaMart.

The relevant information may also specify when the PizzaMart coupons expire, individual coupon codes, and which pizzas are covered by the coupons. The user may use the relevant information to contact business 308. In this example, the user may click on a hyperlink included in the relevant information from radio frequency identification tag 314 to open a chat session with business 308. Business 308 may be the nearest PizzaMart, based on the user's zip code. Receiver 304 may fill in the necessary information in order to fill the order. Necessary information may also be extracted from the label within radio frequency identification tag 314. Necessary information is the information required to fulfill a business transaction. For example, in the present example, the necessary information may specify the delivery address of the user and the coupon code so that the user orders a pizza associated with the coupons within mail 316.

The user may place an order electronically using the coupons within mail 316 without having to physically retrieve mail 316. Alternatively, the user may use cell phone 306 to place the order. The user may access relevant information from mailbox 302 at any time using receiver 304, cell phone 306, or other device synchronized to communicate with mailbox 302.

In other examples, mail 316 may be a bill for goods or services. Once the label information of radio frequency identification tag 314 is sent to receiver, the user may link to an invoice for the monthly bill using the relevant information. The user may then pay the bill using an email and associated electronic payment service.

Receiver 304 may be set to upload all or specified labels to cell phone 306 so that the user may use the information as needed. For example, the user may upload a car service coupon that may be visually displayed to the car service center representative or sent in a message to contract repairs for the user's vehicle.

Figure 4A:
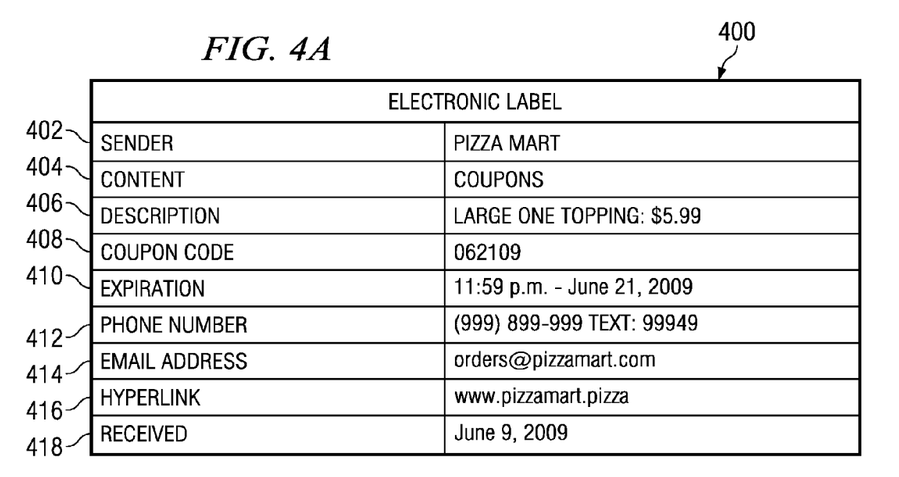
FIGS. 4A-4B are exemplary electronic labels in accordance with the illustrative embodiments.
Figure 4B:
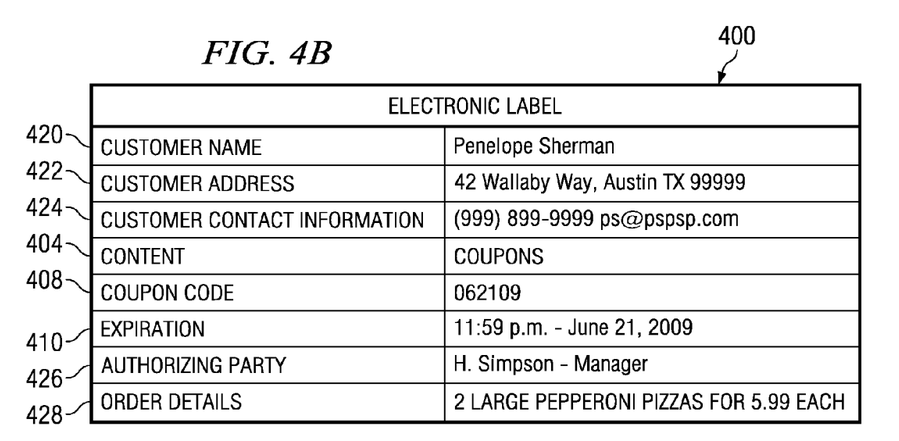

FIGS. 4A-4B are exemplary electronic labels in accordance with the illustrative embodiments. Electronic label 400 is information from mail 316 of FIG. 3. Electronic label 400 may be extracted using a barcode, optical character recognition, or a radio frequency identification tag, such as radio frequency identification tag 314 of FIG. 3. Electronic label 400 may be displayed to a user on a computing device, such as receiver 304 or cell phone 306 of FIG. 3.

Continuing with the previous example, electronic label 400 of FIG. 4A may be displayed to the user on a personal computer. Relevant information of electronic label 400 displayed to the user may specify sender 402, content 404, description 406, coupon code 408, expiration 410, phone number 412, email address 414, hyperlink 416, date received 418, and any other relevant information.

Electronic label 400 may be displayed to the user using a program application, such as a browser or an email application. Alternatively, a designated mail program may be used to display electronic labels for each piece of mail received. The user may establish preferences for each piece of mail. For example, some mail is considered "junk" or "bulk" and the electronic labels may be disregarded or shortened only to specify the contents, such as "credit card offer". In another example, the user may request that electronic label 400 be automatically discarded after expiration 410. The mail recipient may establish the priority, delivery, and notification options and retrieval information for each piece of mail by setting user preferences associated with the mailbox. For example, the mail recipient may use a computing device and a browser to set preferences that are stored in the mailbox.

Relevant information of electronic label 400 may be specified by the mail sender, such as business 308 of FIG. 3 to indicate only the information that the user needs. Electronic label 400 of FIG. 4B includes the information that may be sent from the receiver to the business and includes additional information that may be used by the business to carry out a business transaction.

In the ongoing example, electronic label 400 may specify customer name 420, customer address 422, customer contact information 424, content 404, coupon code 408, expiration 410, and authorizing party 426. In one illustrative embodiment, order details 428 may be added to electronic label 400 based on user input for processing the business transaction. The information included in electronic label 400 may allow the order or other transaction to be authenticated and processed.

Figure 5:
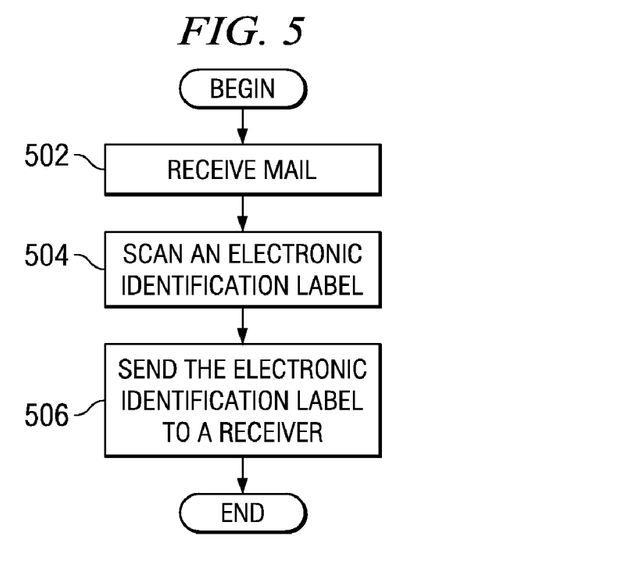
FIG. 5 is a flowchart of a process for managing a remote mailbox in accordance with the illustrative embodiments.

Turning now to FIG. 5, a flowchart of a process for managing a remote mailbox is depicted in accordance with the illustrative embodiments. The process of FIG. 5 may be implemented by mailbox 302 of FIG. 3. The process begins by receiving mail (step 502). The mail may be one or more pieces of mail, such as mail 316 of FIG. 3. The mail may be delivered to the mailbox in person, by an electronic sorting device, or by another delivery mechanism.

Next, the mailbox scans an electronic identification label (step 504). The mailbox may use scanner 312 of FIG. 3 to scan an electronic identification label, such as radio frequency identification tag 314 of FIG. 3. The electronic identification label may take other forms, such as, for example, a bar code or other text that is scanned by an optical scanner to retrieve information regarding the mail.

Next, the mailbox sends the electronic identification label to a receiver (step 506) with the process terminating thereafter. The receiver may be receiver 304 or cell phone 306 of FIG. 3 or other computing device. The electronic label may include relevant information, such as the information shown in electronic label 400 of FIGS. 4A-4B. The electronic identification label may be sent through a network, such as network 310 of FIG. 3, wirelessly or by a physical communications link.

Figure 6:
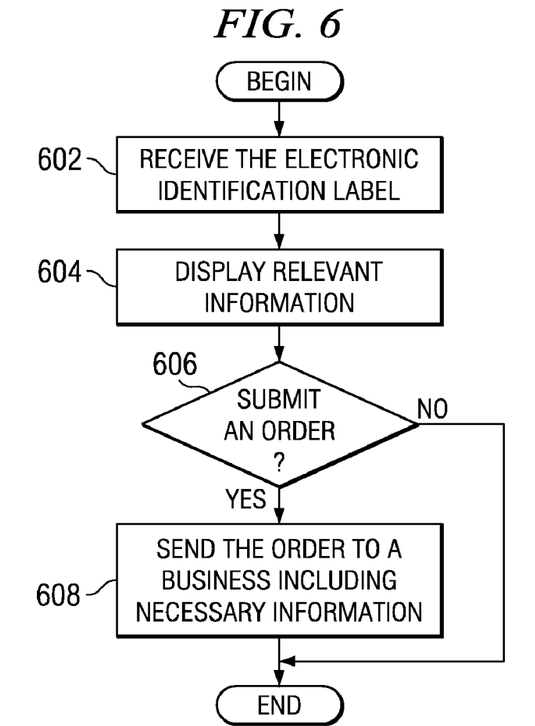
FIG. 6 is a flowchart of a process for interactive mailbox management in accordance with the illustrative embodiments.

With reference now to FIG. 6, a flowchart of a process for interactive mailbox management is depicted in accordance with the illustrative embodiments. The process of FIG. 6 may be implemented by receiver 304 or alternatively by cell phone 306 both of FIG. 3. The process begins by receiving the electronic identification label (step 602). The electronic identification label may be information from radio frequency identification tag 314 of FIG. 3.

Next, the receiver displays relevant information (step 604). The relevant information may be information shown in electronic label 400 of FIG. 4A. Next, the receiver determines whether to submit an order (step 606). The determination of step 606 may be made based on user input. For example, if the user desires to use a coupon displayed in step 604, the user may provide user input to submit the order.

If the user determines not to submit an order, the process terminates. If the user determines to submit an order in step 606, the user sends the order to a business including necessary information (step 608) with the process terminating thereafter. The business may be business 308 of FIG. 3. The necessary information may be specified in electronic label 400 of FIG. 4B.

Thus, the illustrative embodiments provide a computer implemented method, apparatus, and computer usable program code for remotely managing physical mail content. A remote mailbox extracts content information from a radio frequency identification (RFID) tag for each piece of mail. The mailbox notifies the mail recipient of the mail and relevant information. The user may use the relevant information before or after retrieving the mail from the mailbox to perform a business transaction. As a result, the mail recipient may more efficiently access information sent by mail. Additionally, the mail recipient may use the mail more efficiently. The invention can take the form of an entirely hardware embodiment, an entirely software embodiment or an embodiment containing both hardware and software elements. In a preferred embodiment, the illustrative embodiments are implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for interactive mail management of physical mail, the computer implemented method comprising:
   receiving the physical mail in a mailbox;
   responsive to receiving the physical mail in the mailbox, wherein the physical mail contains an identifier, electromagnetically reading the identifier, wherein the identifier is a radio frequency identification tag, wherein the mailbox comprises a scanner, wherein the scanner is a radio frequency identification tag reader, and wherein the scanner electromagnetically reads the identifier;
   electromagnetically sending information contained in the identifier to a mail recipient using the mailbox, wherein the mailbox electromagnetically stores the information and a set of user preferences for electromagnetically accessing the information and the physical mail, and wherein the mail recipient is electromagnetically provided with instructions for electromagnetically communicating with a sender associated with the physical mail based on the information from the identifier.

2. The computer implemented method of claim 1, wherein the mailbox is in a different location from a current location of the mail recipient.

3. The computer implemented method of claim 1, wherein the reading step further comprises:
   transmitting a signal to the radio frequency identification tag to extract contact information.

4. The computer implemented method of claim 1, wherein the identifier is any of a bar code, graphics, or text.

5. The computer implemented method of claim 4, wherein the reading step further comprises:
   scanning the identifier to extract contact information.

6. The computer implemented method of claim 1, further comprising:
   performing a business transaction based on the information wherein necessary information for carrying out the business transaction is included in the information.

7. The computer implemented method of claim 1, further comprising:
   displaying relevant information included in the information to the mail recipient.

8. The computer implemented method of claim 6, wherein the necessary information includes an identification of the physical mail received.

9. The computer implemented method of claim 1, wherein the mail recipient receives the information on a computing device.

10. A data processing system for interactive mail management of physical mail, the data processing system comprising:
- a bus system;
- a communications system connected to the bus system;
- a memory connected to the bus system, wherein the memory includes a set of instructions; and
- a processing unit connected to the bus system, wherein the processing unit executes the set of instructions to receive the physical mail in a mailbox; to read the identifier responsive to receiving the physical mail in the mail box, wherein the physical mail contains an identifier, wherein the identifier is a radio frequency identification tag, wherein the mailbox comprises a scanner, wherein the scanner is a radio frequency identification tag reader, and wherein the scanner is used to read the identifier; to send information contained in the identifier to a mail recipient using the mailbox, wherein the mailbox stores the information and a set of user preferences for accessing the information and the physical mail, and wherein the mail recipient is provided with instructions for communicating with a sender associated with the physical mail based on the information from the identifier; and communicating with the sender based on the information.

11. The data processing system of claim 10 further comprising:
- performing a business transaction based on the information wherein necessary information for carrying out the business transaction is included in the information.

12. The data processing system of claim 10, wherein the instructions for communicating with the sender are any of a phone number, email address, hyperlink, instant message identification, and text messaging number.

13. The data processing system of claim 10, wherein the information includes an electronic identification label, and wherein the data processing system displays the electronic identification label to a mail recipient.

14. A recordable computer readable medium comprising instructions that cause a computer to perform interactive mail management of physical mail, the interactive mail management comprising the steps of:
- receiving physical mail in a mailbox; electromagnetically reading the identifier responsive to receiving the physical mail in the mailbox, wherein the physical mail contains an identifier, wherein the identifier is a radio frequency identification tag, wherein the mailbox comprises a scanner, wherein the scanner is a radio frequency identification tag reader, and wherein the scanner electromagnetically reads the identifier; electromagnetically sending information contained in the identifier to a mail recipient using the mailbox, wherein the mailbox electromagnetically stores the information and a set of user preferences for electromagnetically accessing the information and the physical mail, and wherein the mail recipient is electromagnetically provided with instructions for electromagnetic communication with a sender associated with the physical mail based on the information from the identifier; and communicating with the sender based on the information.

15. The recordable computer readable medium of claim 14, wherein the identifier is a radio frequency identification tag, wherein the mailbox is in a remote location based on a current location of the mail recipient, wherein the recordable computer readable medium further comprises:
- computer usable program code for transmitting a signal to the radio frequency identification tag to extract the information.

16. The recordable computer readable medium of claim 14, wherein the reading step further comprises:
- displaying relevant information included in the information to the mail recipient.

\* \* \* \* \*